(12) United States Patent
Jungwirth et al.

(10) Patent No.: US 9,689,540 B2
(45) Date of Patent: Jun. 27, 2017

(54) OPTICAL MODIFICATIONS FOR CHANGING POWER DENSITY OF SOLAR SIMULATOR SYSTEMS

(71) Applicant: The Boeing Company, Chicago, IL (US)

(72) Inventors: Douglas R. Jungwirth, Porter Ranch, CA (US); Philip T. Chiu, La Crescenta, CA (US)

(73) Assignee: The Boeing Company, Chicago, IL (US)

( * ) Notice: Subject to any disclaimer, the term of this patent is extended or adjusted under 35 U.S.C. 154(b) by 255 days.

(21) Appl. No.: 14/704,561

(22) Filed: May 5, 2015

(65) Prior Publication Data

US 2016/0327224 A1 Nov. 10, 2016

(51) Int. Cl.
*F21S 8/00* (2006.01)
*G01J 1/08* (2006.01)
*F21V 13/04* (2006.01)
*F21Y 113/00* (2016.01)

(52) U.S. Cl.
CPC ............... *F21S 8/006* (2013.01); *G01J 1/08* (2013.01); *F21V 13/04* (2013.01); *F21Y 2113/00* (2013.01)

(58) Field of Classification Search
CPC .. F21S 8/006; G01J 1/08; F21V 13/04; F21Y 2113/00
See application file for complete search history.

(56) References Cited

U.S. PATENT DOCUMENTS

| 7,839,503 | B2 | 11/2010 | Jungwirth et al. | |
| 8,220,941 | B2 | 7/2012 | Jungwirth et al. | |
| 8,378,661 | B1 * | 2/2013 | Cravey | G01J 1/0411 250/200 |
| 8,439,530 | B2 | 5/2013 | Jungwirth | |
| 2011/0241549 | A1 * | 10/2011 | Wootton | F21S 8/006 315/117 |

* cited by examiner

*Primary Examiner* — Mary Ellen Bowman
(74) *Attorney, Agent, or Firm* — Ostrager Chong Flaherty & Broitman P.C.

(57) ABSTRACT

An apparatus and methods for retrofitting known solar simulator systems to allow the exit beam to be changed in size and location without changing the other fundamental functions of the main optical elements. The solar simulator system is provided with means for de-magnifying the exit beam to provide higher power densities at the illumination plane. By adding or replacing one final optical element, the system user can change the location of the illumination plane and the size of the illumination area. This change in size can increase or decrease the power density of the exit beam.

19 Claims, 7 Drawing Sheets

OPTICAL MODIFICATIONS FOR CHANGING POWER DENSITY OF SOLAR SIMULATOR SYSTEMS

BACKGROUND

This disclosure generally relates to test equipment for photovoltaic cells and, more particularly, relates to solar simulator systems used in testing of photovoltaic cells.

Photovoltaic cells (solar cells) have been used for many years to generate electrical energy from sunlight. Solar panels, which typically include many individual cells, have been deployed in space and terrestrial applications. Terrestrial photovoltaic cells are quickly becoming a viable product and, therefore, techniques, equipment, and technologies related to the testing of terrestrial cells in a quick and economical manner are in demand.

Terrestrial photovoltaic cells may be exposed to "multiple" sun sources using mirrors, reflectors, and/or lenses that concentrate sunlight into a smaller area, which results in higher radiation energy per square unit of area. Such concentration is desirable to generate higher current per cell. Accordingly, test equipment and technologies for terrestrial photovoltaic cells are often designed to test cells using light that emulates the solar energy equivalent to 500-5000 individual suns. This high level of solar energy may be necessary to accurately characterize the performance of the cells in the intended application.

Unlike photovoltaic cells designed for outer space applications, terrestrial photovoltaic cells can be exposed to sunlight that is "filtered" through different atmospheric and/or environmental conditions. Moreover, the altitude at which the cells will be deployed can influence the spectral (wavelength) characteristics of sunlight. Consequently, a solar simulator for testing photovoltaic cells should be configured to provide accurate spectral adjustability to simulate different types of sunlight conditions.

Solar simulator systems typically operate at the upper end of the lamp current range to obtain a target optical power density. The lamps are operated at a current to obtain the desired optical power density, and when the lamp dies or becomes unstable, the system operator changes out the lamp.

In many solar simulator designs, the exit beam size and therefore the optical power density at the illumination plane is constant and defined by the original design. Due to optical losses or test requirements that call for increased power density (at the possible expense of total illumination area), it is desired to be able to de-magnify the exit beam to provide higher power densities at the illumination plane. Presently, with at least one existing design, the power density cannot be changed without a significant redesign of many of the optical elements.

It would be desirable to provide means and methods for retrofitting known solar simulator systems to allow the exit beam to be changed in size and location without changing the other fundamental functions of the main optical elements.

SUMMARY

The subject matter disclosed herein is directed to apparatus and methods for retrofitting known solar simulator systems to allow the exit beam to be changed in size and location without changing the other fundamental functions of the main optical elements. The disclosed subject matter is further directed to solar simulator systems having means for de-magnifying the exit beam to provide higher power densities at the illumination plane. By adding or replacing one final optical element, the system user can change the location of the illumination plane and the size of the illumination area. This change in size can increase or decrease the power density of the exit beam.

One aspect of the subject matter disclosed in detail below is a solar simulator system comprising: a first light source configured to generate a first optical beam; a first tipping lens disposed in front of the first light source at a location along a path of the first optical beam; a first spectral filter assembly configured to receive the first optical beam from the first tipping lens, split the first optical beam into a first plurality of beamlets, and then filter the first plurality of beamlets; a first re-imaging assembly configured to re-image the first plurality of beamlets received from the first spectral filter assembly so that the beamlets of the first plurality will mutually overlap in an illumination plane; and a re-sizing lens configured to change a cross-sectional dimension of an optical beam impinging thereon, wherein the re-sizing lens is disposed along an optical path that starts at the first re-imaging assembly and ends at the illumination plane. The solar simulator system may further comprise: a second light source configured to generate a second optical beam; a second tipping lens disposed in front of the second light source at a location along a path of the second optical beam; a second spectral filter assembly configured to receive the second optical beam from the second tipping lens, split the second optical beam into a second plurality of beamlets, and then filter the second plurality of beamlets; a second re-imaging assembly configured to re-image the second plurality of beamlets received from the second spectral filter assembly so that the beamlets of the second plurality will mutually overlap in the illumination plane; a dichroic mirror disposed such that the first plurality of beamlets are incident on a first side of the dichroic mirror and the second plurality of beamlets are incident on a second side of the dichroic mirror, the dichroic mirror being configured to transmit respective portions of the first plurality of beamlets toward the re-sizing lens and reflect respective portions of the second plurality of beamlets toward the re-sizing lens; and a reflector mirror disposed to receive an optical beam from the re-sizing lens and configured to reflect a portion thereof toward the illumination plane. In this embodiment, the re-sizing lens is disposed between the dichroic mirror and the reflector mirror.

Another aspect of the subject matter disclosed in detail below is a solar simulator system comprising: a dichroic mirror having first and second sides; a reflector mirror having first and second sides; a re-sizing lens disposed between the dichroic mirror and the reflector mirror; a first light source configured to generate a first optical beam; a first tipping lens disposed in front of the first light source at a location along a path of the first optical beam; a first spectral filter assembly configured to receive the first optical beam from the first tipping lens, split the first optical beam into a first plurality of beamlets, and then filter the first plurality of beamlets; a first re-imaging assembly configured to re-image the first plurality of beamlets received from the first spectral filter assembly so that the beamlets of the first plurality will mutually overlap in an illumination plane after impinging on the first side of the dichroic mirror, passing through the dichroic mirror, passing through the re-sizing mirror, and being reflected by the first side of the reflector mirror; a second light source configured to generate a second optical beam; a second tipping lens disposed in front of the second light source at a location along a path of the second optical beam; a second spectral filter assembly configured to receive the second optical beam from the second tipping lens, split the second optical beam into a second plurality of beamlets, and then filter the second plurality of beamlets; and a second re-imaging assembly configured to re-image the second plurality of beamlets received from the second spectral filter assembly so that the beamlets of the second plurality will mutually overlap in the illumination plane after being reflected by the second side of the dichroic mirror, passing through the re-sizing mirror, and being reflected by the first side of the reflector mirror.

A further aspect of the subject matter disclosed below is a method of retrofitting a solar simulator system that comprises a light source, a tipping lens, a spectral filter assembly, a re-imaging assembly, and an illumination plane, the method comprising: installing a re-sizing lens at a location along an optical path that starts at the re-imaging assembly and ends at the illumination plane. In cases wherein the solar simulator system further comprises a dichroic mirror and a reflector mirror, the re-sizing mirror is installed between the dichroic mirror and the reflector mirror.

Yet another aspect is a method of retrofitting a solar simulator system that comprises a light source, a spectral filter assembly, a re-imaging assembly, and an illumination plane, the method comprising: installing a tipping lens between the light source and the spectral filter assembly; and installing a re-sizing lens at a location along an optical path that starts at the re-imaging assembly and ends at the illumination plane. Again, in cases wherein the solar simulator system further comprises a dichroic mirror and a reflector mirror, the re-sizing mirror is installed between the dichroic mirror and the reflector mirror.

A further aspect is a method of changing an optical power density of a solar simulator system, comprising: removing a first re-sizing lens having a first focal length; and installing a second re-sizing lens having a second focal length different than the first focal length.

Other aspects of solar simulator systems having means and methods for changing the optical power density at the illumination plane are disclosed below.

BRIEF DESCRIPTION OF THE DRAWINGS

Reference will hereinafter be made to the drawings in which similar elements in different drawings bear the same reference numerals.

DETAILED DESCRIPTION

To facilitate an understanding of the various embodiments, the general architecture and operation of a known solar simulator system will be described with reference to FIGS. 1-8.

Solar simulator systems are used for testing solar cells. Solar simulator system (also referred to as solar simulators) emulate sunlight by replicating the spectral distribution of natural sunlight. In a typically method for testing solar cells, a solar simulator illuminates a test solar cell on an illumination plane with a light beam within a specific bandwidth range. Since solar cells are designed for a number of different applications (i.e., some cells are designed to operate in space while others are designed for terrestrial use), a solar simulator evaluates the performance of each type of cell by using the same solar spectrum in which that cell is designed to operate. The voltage and current parameters as well as overall conversion efficiency of the solar cell are monitored and measured.

It is desirable for a solar simulator to accurately replicate the real-world environment for a solar cell in a test environment set-up. Furthermore, it is desirable for a solar simulator to have the flexibility to adjust the solar spectrum projected onto an illumination plane, where the solar cell being tested will be located. The solar spectrum may be adjusted by selecting the quantity and range of wavelengths (bands) that impinge upon the illumination plane.

A solar simulator system in accordance with the embodiments disclosed in detail below incorporates two independent light sources, multiplexed into the same optical beam path, each of which is broken up into many smaller beamlets having respective beamlet paths. However, the solution disclosed herein can be used in systems having only one lamp and systems having more than two lamps. For each lamp, the smaller beamlet paths are individually filtered spectrally and then re-imaged to overlap at the illumination plane at some point in space. Appropriate imaging lenses, optical filters and irises are put in place to be able to adjust any portion of the spectrum from 100% to 0% of the input light. This makes the system adjustable within various spectral bands.

Figure 1:
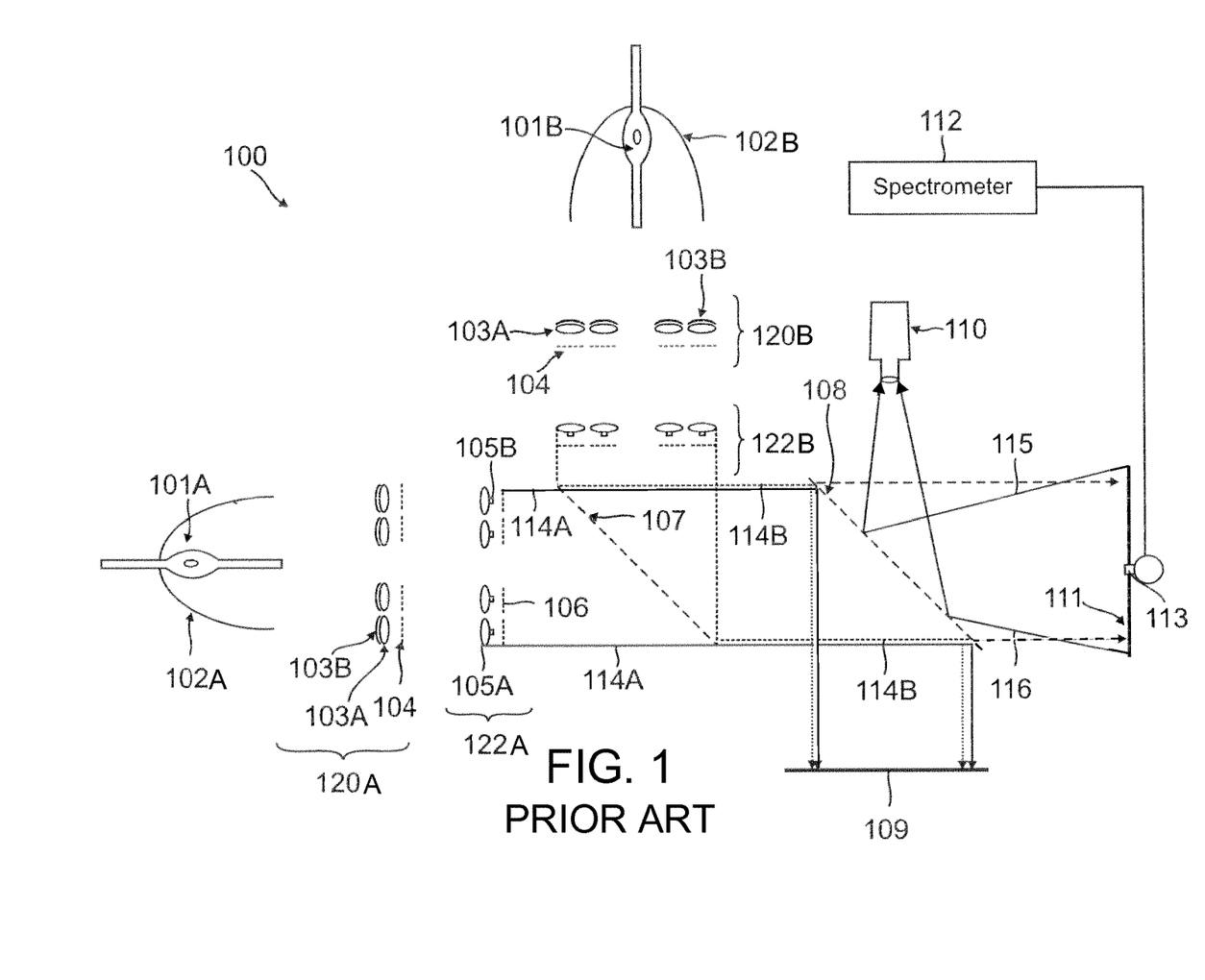
FIG. 1 is a diagram representing optical components of a known solar simulator system.

FIG. 1 is a diagram representing components of a known solar simulator 100 for testing solar cells. The solar simulator 100 may include two independent light sources, lamps 101A and 101B. Lamps 101A and 101B both provide input light for an illumination plane 109, where a solar cell (not shown) to be tested is located. The lamps 101A and 101B may be of the same type or different, for example, xenon, mercury, incandescent, metal vapor or any other type of lamp.

The optical elements used with lamp 101B are similar in function to the optical elements used with lamp 101A, except the optics with lamp 101B may filter wavelengths of light different than the wavelengths of light filtered by the optics for lamp 101A.

Lamps 101A and 101B generate respective beams of light (referred to herein as "optical beams") that are reflected from respective reflectors 102A and 102B. Each reflector 102A, 102B includes a reflective internal surface that collects and collimates the light emanating from the source, i.e., lamp 101A or 101B, and redirects the optical beam in the desired direction. The boundaries of the optical beam 114A from lamp 101A are indicated by a pair of parallel solid lines (best seen in FIG. 3), while boundaries of the optical beam 114B from lamp 101B are indicated by a pair of parallel dotted lines. The angled dashed lines in FIG. 3, which are disposed at 45-degree angles with respect to the boundaries of optical beam 114A, represent a dichroic mirror 107 and a reflector mirror 108 respectively.

Referring back to FIG. 1, the light from lamp 101A is passed through a spectral filter assembly 120A and then through a re-imaging assembly 122A placed upstream from the spectral filter assembly 120A. Similarly, the light from lamp 101B is passed through a spectral filter assembly 120B and then through a re-imaging assembly 122B placed upstream from the spectral filter assembly 120B.

Figure 2:
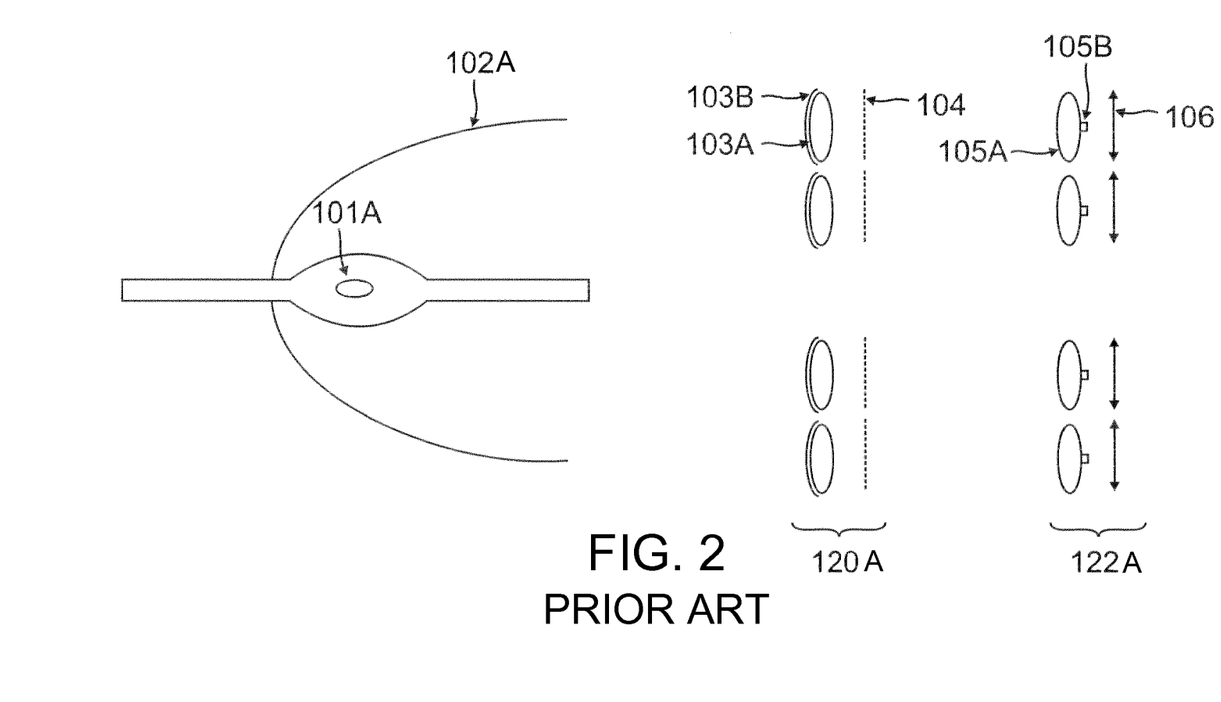
FIG. 2 is a diagram representing some of the optical components of the solar simulator system depicted in FIG. 1 on a magnified scale.

The optical path for optical beam 114A from lamp 101A passes through spectral filter assembly 120A, which spectrally filters the light that passes therethrough. As best seen in FIG. 2, spectral filter assembly 120A comprises a plurality of field lenses 103A, wherein each field lens 103A has a band-pass coating 103B associated with it. Spectral filter assembly 120A may also include uniformity masks 104. FIG. 2 shows an example of how the components of spectral filter assembly 120A and re-imaging assembly 122A are aligned with respect to lamp 101A. The components of spectral filter assembly 120B and re-imaging assembly 122B may be aligned with respect to lamp 101B in a similar manner.

Referring back to FIG. 1, in each of the spectral filter assemblies 120A and 120B, field lenses 103A split the input beam into "N" separate beamlets, one for each field lens. Field lenses 103A also modify the divergence of the individual beamlets to fully fill the next lens in the simulator system 100. The shape of field lenses 103A determines the shape of the final illuminated beam footprint. In one embodiment, field lenses 103A are round, square, rectangular or hexagonal lenses disposed in a hexagonal pattern.

As best seen in FIG. 2, each field lens 103A includes a band-pass coating 103B that acts as a band-pass filter allowing transmission of only selected wavelengths (i.e., a selected band of wavelengths) of light. The fact that each of the individual beam paths have only one "band" (or wavelength) of light allows the user to vary the intensity of a specific individual beamlet to increase or decrease the portion of the light spectrum that impinges on the illumination plane 109. Band-pass coatings 103B may be provided on one or more surfaces of the field lens 103A. In one embodiment, field lenses 103A and band-pass coatings 103B are chosen in matched pairs to maintain a spectral balance across the illumination plane area (explained below with respect to FIG. 6).

The beamlets exiting from field lenses 103A may also pass through respective uniformity masks 104. Masks 104 are positioned upstream from field lenses 103A in the simulator system 100. Masks 104 are used to balance brightness level. Masks 104 are spatially varying transmission elements and are designed to compensate for the natural intensity variations across the area of the optical beam. The spatial resolution of mask 104 is higher than the spatial resolution of the illumination plane 109 (i.e., solar cell). In one embodiment, each field lens 103A is provided with its own uniformity mask 104. In one embodiment, mask 104 may be made of glass with a reflective aluminum coating.

Referring again to FIG. 1, after the spatially balanced beam passes through masks 104, the respective beamlets impinge on respective re-imaging assemblies 122A and 122B respectively placed upstream from the spectral filter assemblies 120A and 120B. According to one embodiment, each re-imaging assembly includes a plurality of projection lenses 105A, each projection lens 105A having an obscuring dot 105B and an associated iris mechanism (hereinafter "iris") 106. Projection lenses 105A re-image the beamlets coming through field lenses 103A to the illumination plane 109. Projection lenses 105A are positioned laterally such that all the individual images overlap at illumination plane 109.

Each iris 106 controls the magnitude of light coming from its associated projection lens 105A. As an iris 106 opens and closes, it increases or decreases the amount of light that is allowed to proceed along that optical beam path. By controlling the level to which an iris 106 opens (or closes), the spectral bandwidth of light impinging (i.e., incident) on illumination plane 109 can be adjusted.

Figure 5:
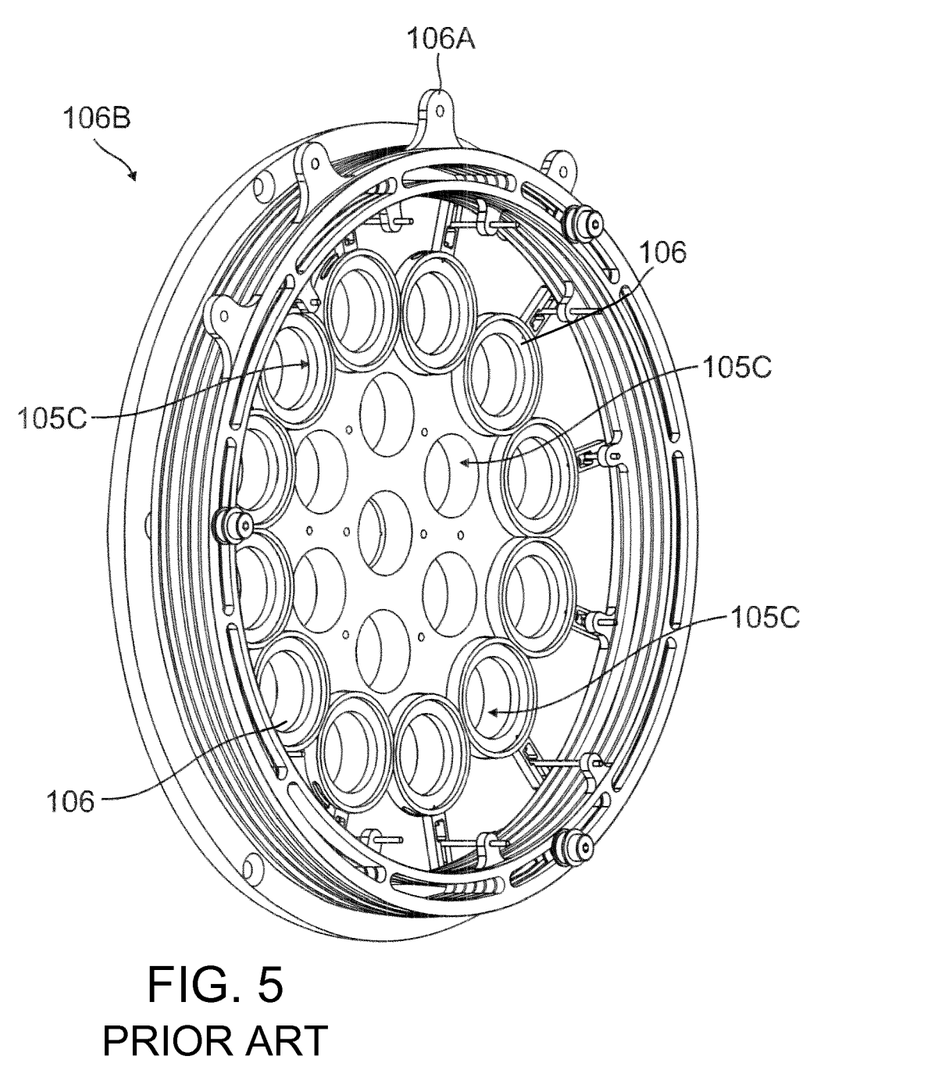
FIG. 5 is a diagram showing a segment of the solar simulator system depicted in FIG. 1 having matched pairs of irises.

Irises 106 may be used in matched pairs arranged symmetrically across the center of the optical configuration (explained below in detail with respect to FIGS. 5 and 6). In one embodiment, irises 106 are motorized to provide an automatic adjustment of the spectral content of the lamp light impinging on illumination plane 109.

For solar simulators in which the irises 106 cannot close completely due to their construction, an obscuring dot 105B is placed on the center of each projection lens 105A, as seen in FIG. 2. Obscuring dot 105B is a miniscule coating of a reflective material on a projection lens 105A that allows 0% transmission to the illumination plane 109. The reflective material used for obscuring dot 105B may be aluminum or any other material that blocks transmission of light. The size of obscuring dot 105B depends on the type and structure of iris 106. In one embodiment, obscuring dot 105B is only slightly bigger in diameter then the smallest diameter of iris 106 in the closed position. Iris 106, when used with obscuring dot 105B, allows adjusting the spectral assembly transmission from 0% to 100%.

Figure 7:
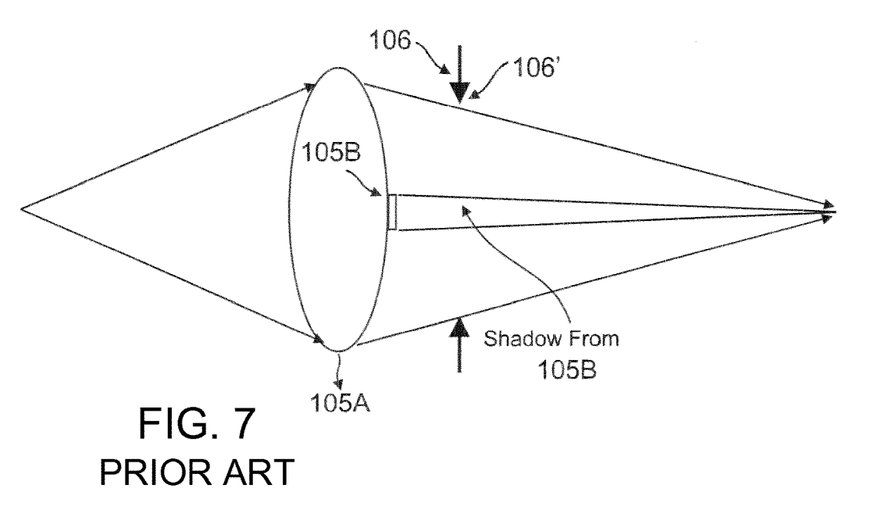
FIGS. 7 and 8 are diagrams representing (on a magnified scale) a projection lens and an associated iris (of the solar simulator system depicted in FIG. 1) when the iris is in open and closed states respectively.
Figure 8:
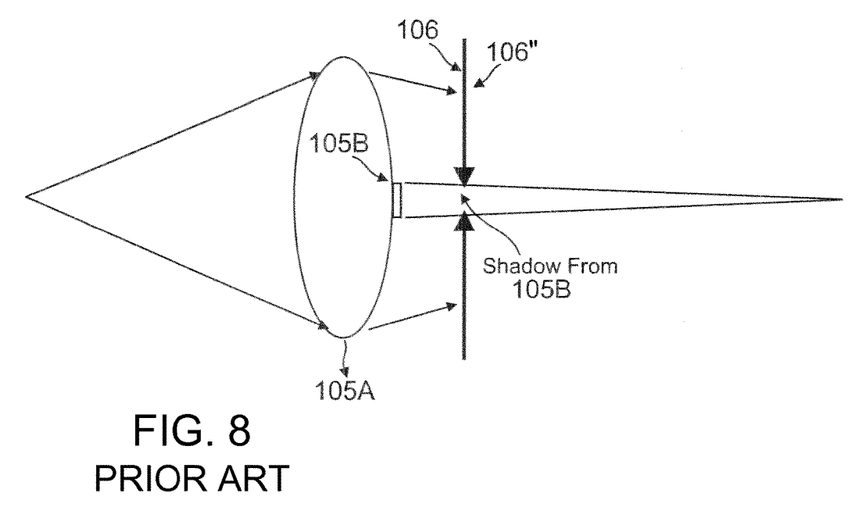

FIG. 7 illustrates 100% transmission through a re-imaging assembly when iris 106 is in a fully open position (shown as 106'). FIG. 8 illustrates 0% transmission through the re-imaging assembly with iris 106 is in a closed position (shown as 106") and obscuring dot 105B ensuring that there is no transmission. Thus each re-imaging assembly 122A, 122B (see FIG. 1) allows 0% to 100% adjustment of any wavelength band of spectrum reaching the illumination plane 109.

Figure 3:
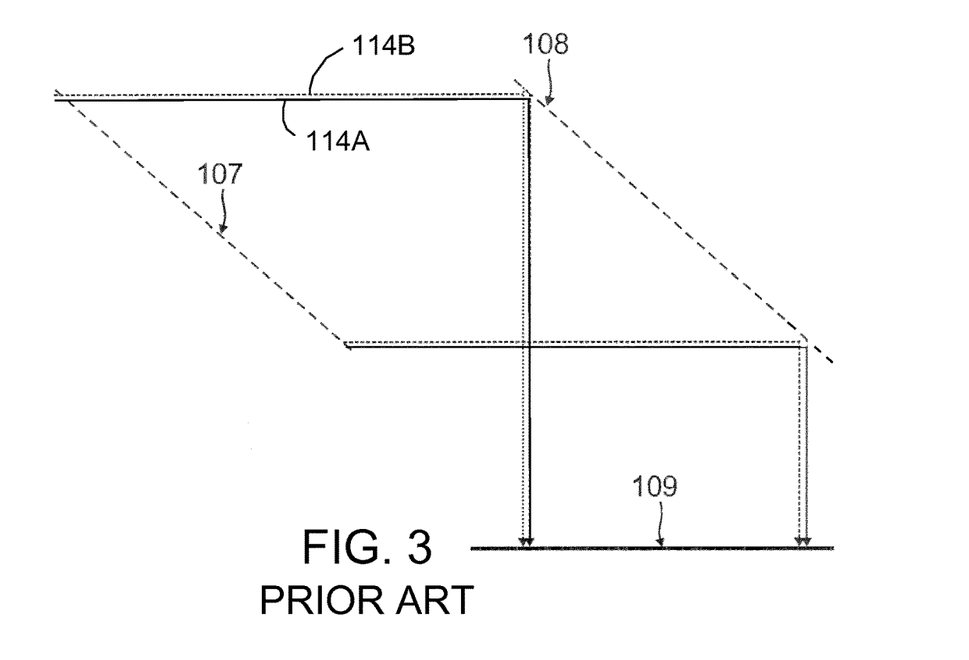
FIG. 3 is a diagram representing the lamp-produced optical beams incident on the illumination plane after interacting with the mirrors of the solar simulator system depicted in FIG. 1.

Referring to FIG. 1, the respective optical beams from re-Imaging assemblies 122A, 122B pass via a dichroic mirror 107 positioned upstream to the re-imaging assemblies 122A, 122B. Dichroic mirror 107 (shown in detail in FIG. 3) allows transmission of light having a wavelength in a certain range and reflects light having wavelengths outside that range. Dichroic mirror 107 may be designed to transmit light from lamp 101A that is transmitted through any of the field lenses 103A (with their band-pass filters 103B) in spectral filter assembly 120A and to reflect similar light received from lamp 101B. As seen in FIG. 3, dichroic mirror 107 is aligned with reflector mirror 108 to overlap the transmitted beam from lamp 101A with the reflected beam from lamp 101B on the illumination plane 109.

In one embodiment, dichroic mirror 107 when used with lamp 101A allows visible light to pass through and reflects infra-red light. When used with lamp 101B, dichroic mirror 107 reflects infra-red light onto illumination plane 109 and allows the visible light to pass through.

Figure 4:
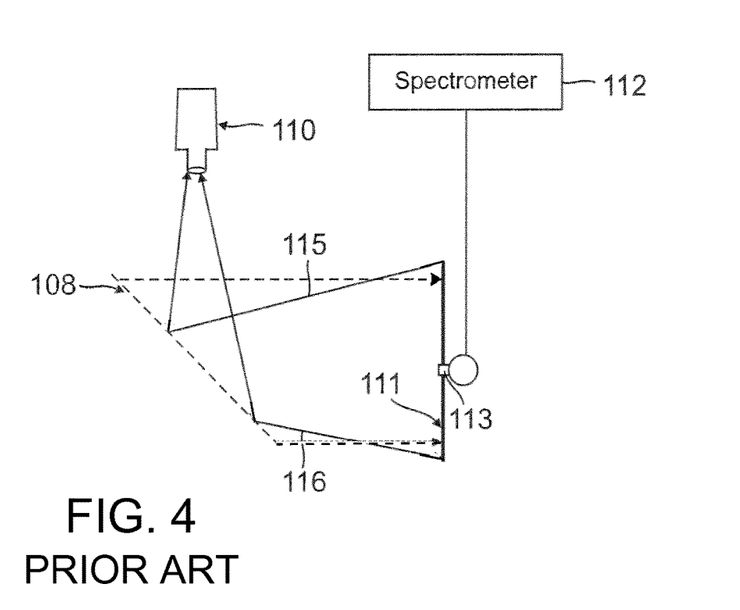
FIG. 4 is a diagram representing a diagnostic plane and associated components of the solar simulator system depicted in FIG. 1.

In the embodiment shown in FIG. 1, the optical beam from dichroic mirror 107 passes to a reflector mirror 108. Reflector mirror 108 reflects the majority of the beam (for example, 99%) toward the illumination plane 109 (as seen in FIG. 3), while the remaining portion (for example 1%) is transmitted to a diagnostic plane 111 (as seen in FIG. 4). The reflected beam is projected to the illumination plane 109 for testing, while the transmitted beam (to the diagnostic plane 111) is used for diagnostics of the overall simulator system 100. At the illumination plane 109, the solar cell (not shown) is tested and its results are monitored.

In one embodiment, diagnostic plane 111 is a point in space equidistant from the lamps 101A and 101B as the illumination plane 109. The diagnostic plane 111 has a flat plate (normal to incoming light) that is covered with a uniform "white" scattering material which scatters the incoming light in a Lambertian distribution scatter.

In accordance with the embodiment depicted in FIG. 1, a monitoring system may be used at the diagnostic plane 111 to monitor the optical content on the diagnostic plane 111. The monitoring system may include an integrating sphere 113 and/or a camera 110 for tracking and analyzing the optical content at diagnostic plane 111. The simulator system uses integrating sphere 113 to assist in measuring the spectral content of light impinging on illumination plane 109. The light from integrating sphere 113 may be sent to a spectrometer 112 and the total spectrum of the illuminating light may be measured and recorded. This spectrum may be used to modify the spectrum of light at illumination plane 109 to a desirable value. Irises 106 may be adjusted to change the light that is passed to illumination plane 109. This allows one to adjust the optical beam based on the solar cell operating environment.

As shown in detail in FIG. 4, the camera 110 may be used to view the diagnostic plane 111. Some of the light scattered by diagnostic plane 111 will go back in the original direction, be reflected by reflector 108, and then be imaged by camera 110. The boundaries of this light are indicated by solid arrows 115 and 116 in FIG. 4. The image from camera 110 provides an accurate map of the intensity distribution seen at the illumination plane 109. The integrated value from camera 110 provides a power measurement for light impinging on illumination plane 109.

Referring again to FIG. 1, the specific design of field lenses 103A and projection lenses 105A may be determined in conjunction with all the other optical elements of the simulator to provide a smooth, uniform illumination at the illumination plane 109.

In one embodiment, irises 106, field lenses 103A, and projection lenses 105A are used in matched pairs arranged symmetrically across the center of the optical configuration. FIG. 5 shows an assembly 106B with a plurality of holes 105C that are configured to receive matched pairs of field lenses in a hexagonal pattern. Irises 106 may be adjusted mechanically using mechanism 106A or via motorized means (not shown).

Figure 6:
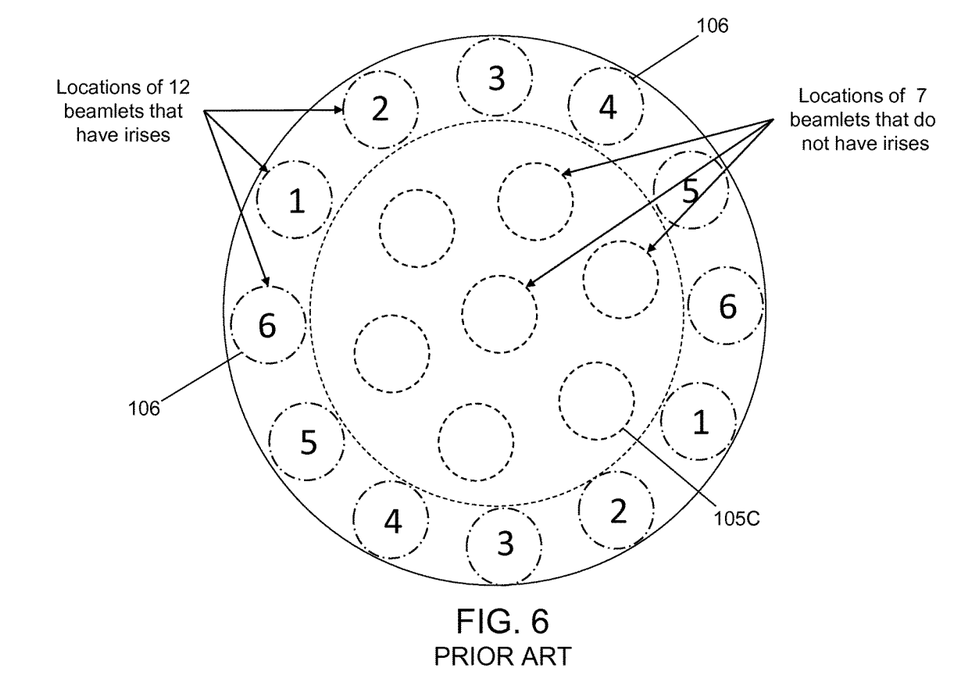
FIG. 6 is a diagram showing the locations of beamlets having matched pairs of irises in the re-imaging assembly of the solar simulator system depicted in FIG. 1.

FIG. 6 identifies the physical (relative) locations of the beamlets with irises 106 and the locations of the beamlets without irises in accordance with one embodiment. The matched pairs are indicated by the matching numbers on irises. In the Illustrated embodiment, twelve irises (six pairs) are shown on the outer periphery. However, those of ordinary skill in the art will appreciate that each re-imaging assembly could include any number of irises 106. The outside iris positions have easy access to the levers that control the iris opening or closing positions. To access irises on the inside, some of the light on the outer beamlet paths could be blocked. Technically, they all could be used as variable iris paths, but the mechanical implementation of that would be more difficult. Each matched pair of irises 106 block a desired quantity of light within a given wavelength. This balances out some of the non-uniformity that occurs when beams hit the illumination plane 109 at a non-normal incidence angle. Each re-imaging assembly 122A, 122B (see FIG. 1) thus produces a symmetrical and balanced output beam.

The field lenses 103A with band-pass filters 103B, and the projection lenses 105A with obscuring dots 105B may similarly be arranged in matched pairs placed diametrically opposite to each other. The spectral content of the light within one portion of the beam's cross section is closely matched with the spectral content of the light within the diametrically opposed portion of the beam's cross section.

In accordance with the embodiment depicted in FIG. 1, system 100 provides the capability for a light spectrum of each lamp to be broken up into as many as eighteen different bandwidths and, with the help of an iris 106 and an obscuring dot 105B on the projection lens 105A, each of those bands can be independently adjusted from 0% to 100% of the available light from the appropriate lamp. Each of these eighteen bands is projected to illumination plane 109 in two "matched" beams whose angle of incidence is symmetric about the normal to the illumination plane 109 and at an angle close enough to the normal to maintain very good spatial uniformity. It also provides a technique to improve the uniformity of each of the individual beams to almost any level that is desired.

The movement of irises 106 may be motorized and along with the monitoring system (spectrometer 112 or other sensors). This may be computer controlled to provide a continuous spectral match to virtually any spectrum, either static or variable in time.

The pairs of field lenses 103A and projection lenses 105A split up and re-image the different portions of the optical beams from the two lamps 101A, 101B to overlap at illumination plane 109. This provides for enhanced spatial uniformity and jitter reduction. Also, since the lenses work in matched, balanced pairs, this minimizes non-uniformities that might occur from a non-zero angle of incidence.

In addition, spectral band-pass filters 103B, again in matched, balanced pairs, allow only certain wavelengths of light to be transmitted on each individual beam path. Increasing and decreasing the effective throughput for each of these individual beam paths allow the system to adjust the spectrum to any value desired Spectral balancing is done with the use of a respective iris 106 after each projection lens 105A. Obscuring dot 105B placed at the center of the projection lens 105A allows iris 106 to completely block transmission of 15-0203 light of that wavelength band along that particular beamlet path of the system 100. This allows 0% to 100% adjustment of any wavelength band of the spectrum. Computer control of irises 106, along with feedback from the spectrometer 112 or other wavelength sensor, allow real-time control of the light spectrum that is being sent to illumination plane 109. Up to eighteen different, matched pairs of irises may be used in this system. This allows the spectrum to be split up into eighteen different small wavelength bands that may be adjusted separately and continuously.

The set of optical elements described above performs the function of re-imaging each light source to the illumination plane by breaking each beam up into a number of beamlets and then re-imaging those beamlets to enlarge and overlap them, spatially, at the illumination plane to achieve better spatial uniformity. Due to optical losses or test requirements that call for increased power density (at the possible expense of total illumination area), it would be advantageous if the system depicted in FIG. 1 could be adapted to de-magnify the exit beam to provide higher power densities at the illumination plane without changing the other fundamental functions of the main optical elements.

Figure 9:
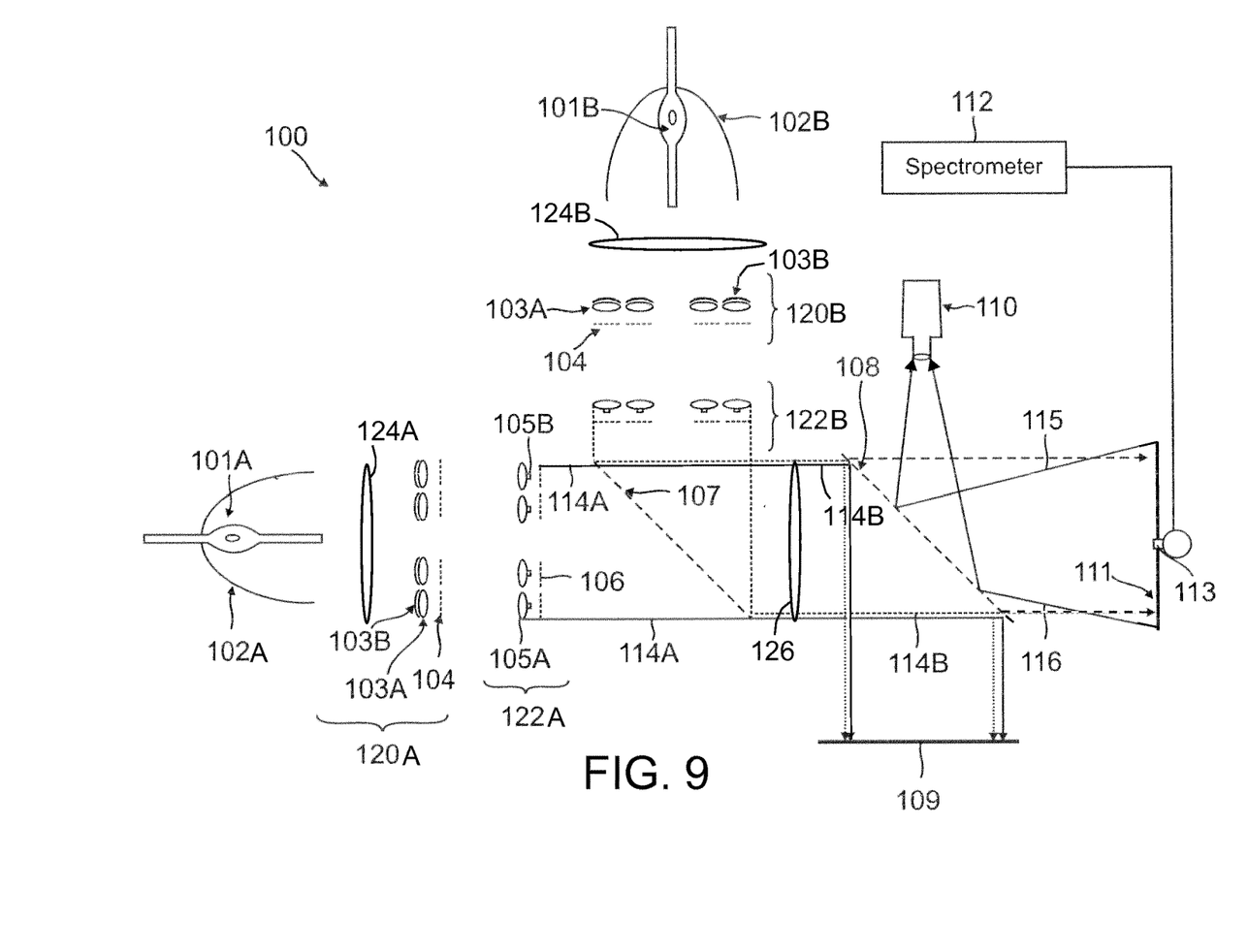
FIG. 9 is a diagram representing optical components of a solar simulator system retrofitted to include optical modifications that allow exit beam expansion or contraction.

In accordance with one embodiment, the system depicted in FIG. 1 can be provided with a capability to change the size and location of the exit beam at the illumination plane 109 by installing respective tipping lenses 124A, 124B in front of lamps 101A, 101B respectively and by installing a re-sizing lens 126 between the dichroic mirror 107 and reflector mirror 108, as shown in FIG. 9. The tipping lenses 124A and 124B focus the light from lamps 101A and 101B onto the respective spectral filter assemblies 120A and 120B. The re-sizing lens 126 can be selected from a set of re-sizing lenses having different optical characteristics. Which re-sizing lens 126 is selected and installed will depend on the desired size and location of the exit beam at the illumination plane 9. By adding or replacing the re-sizing lens 126, the location of the exit beam on the illumination plane 109 and the size of the illumination area can be changed. If the re-sizing lens 126 decreases the size of the exit beam, this will have the effect of increasing the power density of the exit beam. Conversely, if the re-sizing lens 126 increases the size of the exit beam, this will have the effect of decreasing the power density of the exit beam. The re-sizing lens 126 can be changed without changing any of the other optical elements shown in FIG. 9.

Although the embodiment depicted in FIG. 9 has two lamps 101A and 101B, the beam re-sizing solution disclosed herein can also be applied in solar simulator systems that have only one lamp. For example, for solar simulator systems comprising a lamp, a spectral filter assembly, a re-imaging assembly, and reflector mirror arranged to redirect the beamlets from the re-imaging assembly onto an illumination, a tipping leans can be installed between the lamp and the spectral filter assembly, and a re-sizing lens can be installed between the re-imaging assembly and the reflector mirror. Furthermore, for solar simulator systems that have more than two lamps, a respective tipping lens can be installed between each lamp and its associated spectral filter assembly, and a re-sizing lens can be installed between the reflector mirror and other mirrors that redirect the respective pluralities of beamlets from the respective re-imaging assemblies toward the reflector mirror.

Solar simulator systems which have only one lamp and an associated tipping lens can be retrofitted by installing a re-sizing lens at a location along an optical path that starts at the re-imaging assembly and ends at the illumination plane. Solar simulator systems which have two lamps, associated tipping lenses and a dichroic mirror can be retrofitted by installing a re-sizing lens at a location between the dichroic mirror and the illumination plane. In cases where a reflector mirror redirects the beamlets from the dichroic mirror onto the illumination plane, the re-sizing lens can be installed between the dichroic mirror and the reflector mirror.

Solar simulator systems which have only one lamp and no tipping lens can be retrofitted by installing a tipping lens between the lamp and the spectral filter assembly and further installing a re-sizing lens at a location along an optical path that starts at the re-imaging assembly and ends at the illumination plane. Solar simulator systems which have two lamps and a dichroic mirror, but no tipping lenses, can be retrofitted by installing a first tipping lens between the first lamp and its associated spectral filter assembly, installing a second tipping lens between the second lamp and its associated spectral filter assembly, and installing a re-sizing lens at a location between the dichroic mirror and the illumination plane. In cases where a reflector mirror redirects the beamlets from the dichroic mirror onto the illumination plane, the re-sizing lens can be installed between the dichroic mirror and the reflector mirror.

For solar simulator systems which are already equipped with a re-sizing lens, the optical power density of the system can be changed by removing the existing re-sizing lens and installing a substitute re-sizing lens having a focal length different than the focal length of the re-sizing lens that was removed. The re-sizing lens can be changed to re-image the exit beam to smaller or larger beam diameters with a corresponding change in the optical path length from the re-sizing lens to the illumination plane. If the re-sizing lens is chosen properly, the user will be able to change the final beam size to a variety of final diameters and corresponding optical power densities. These changes can be accomplished with the substitution of a single lens. When the newly installed re-sizing lens has the effect of decreasing the size of the exit beam at the illumination plane, additional spectral filters can be installed in the spectral filter assembly while maintaining the optical power density relatively constant. When the newly installed re-sizing lens has the effect of increasing the size of the exit beam at the illumination plane, such a re-sizing lens could be used to compensate for any increase in the optical power density when spectral filters are removed.

The optical modifications described in the preceding paragraph provide multiple advantages. The retrofitting method disclosed above allows the user to achieve higher than the typical one Sun illumination value with limited modification of the existing system. It enables longer life of each lamp because with the higher starting level on the system, the lamp does not need to be run at such a high current setting. The modifications disclosed herein enable better spectral matching due to the fact that the system can introduce more filters to better match the spectrum. More filters mean more light lost. If the system has more light "headroom", then it can better match the desired spectrum with more filters. Simple "plug and play" modifications allow some existing systems to be upgraded with no modifications to the existing hardware other than the installation of additional lenses. The modifications disclosed herein allow various beam sizes/beam intensities with similar lenses in the same position in the optical train of some existing solar simulator systems.

While apparatus and methods for changing the optical power density in a solar simulator system have been described with reference to various embodiments, it will be understood by those skilled in the art that various changes may be made and equivalents may be substituted for elements thereof without departing from the scope of the claims set forth hereinafter. In addition, many modifications may be made to adapt the teachings herein to a particular situation without departing from the scope of the claims.

The invention claimed is:

1. A solar simulator system comprising:
a first light source configured to generate a first optical beam;
a first tipping lens disposed in front of said first light source at a location along a path of said first optical beam;
a first spectral filter assembly configured to receive the first optical beam from said first tipping lens, split the first optical beam into a first plurality of beamlets, and then filter the first plurality of beamlets;
a first re-imaging assembly configured to re-image the first plurality of beamlets received from the first spectral filter assembly so that the beamlets of the first plurality mutually overlap in an illumination plane; and a re-sizing lens configured to change a cross-sectional dimension of an optical beam impinging thereon, wherein said re-sizing lens is disposed along an optical path that starts at said first re-imaging assembly and ends at the illumination plane.

2. The solar simulator system as recited in claim 1, further comprising a reflector mirror disposed to receive an optical beam from said re-sizing lens and configured to reflect a portion thereof toward the illumination plane.

3. The solar simulator system as recited in claim 2, further comprising:
a second light source configured to generate a second optical beam;
a second tipping lens disposed in front of said second light source at a location along a path of said second optical beam;
a second spectral filter assembly configured to receive the second optical beam from said second tipping lens, split the second optical beam into a second plurality of beamlets, and then filter the second plurality of beamlets;
a second re-imaging assembly configured to re-image the second plurality of beamlets received from the second spectral filter assembly so that the beamlets of the second plurality mutually overlap in the illumination plane; and
a dichroic mirror disposed such that the first plurality of beamlets are incident on a first side of said dichroic mirror and the second plurality of beamlets are incident on a second side of said dichroic mirror, said dichroic mirror being configured to transmit respective portions of said first plurality of beamlets toward said re-sizing lens and reflect respective portions of said second plurality of beamlets toward said re-sizing lens,
wherein said re-sizing lens is disposed between said dichroic mirror and said reflector mirror.

4. The solar simulator system as recited in claim 1, wherein said first spectral filter assembly comprises a plurality of field lenses having at least one band-pass coating formed thereon.

5. The solar simulator system as recited in claim 1, wherein said first re-imaging assembly comprises a plurality of projection lenses and a plurality of irises.

6. A solar simulator system comprising:
a dichroic mirror having first and second sides;
a reflector mirror having first and second sides;
a re-sizing lens disposed between said dichroic mirror and said reflector mirror;
a first light source configured to generate a first optical beam;
a first tipping lens disposed in front of said first light source at a location along a path of said first optical beam;
a first spectral filter assembly configured to receive the first optical beam from said first tipping lens, split the first optical beam into a first plurality of beamlets, and then filter the first plurality of beamlets;
a first re-imaging assembly configured to re-image the first plurality of beamlets received from the first spectral filter assembly so that the beamlets of the first plurality mutually overlap in an illumination plane after impinging on said first side of said dichroic mirror, passing through said dichroic mirror, passing through said re-sizing lens, and being reflected by said first side of said reflector mirror;

a second light source configured to generate a second optical beam;
a second tipping lens disposed in front of said second light source at a location along a path of said second optical beam;
a second spectral filter assembly configured to receive the second optical beam from said second tipping lens, split the second optical beam into a second plurality of beamlets, and then filter the second plurality of beamlets; and
a second re-imaging assembly configured to re-image the second plurality of beamlets received from the second spectral filter assembly so that the beamlets of the second plurality mutually overlap in the illumination plane after being reflected by said second side of said dichroic mirror, passing through said re-sizing lens, and being reflected by said first side of said reflector mirror.

7. The solar simulator system as recited in claim 6, wherein said first spectral filter assembly comprises a first plurality of field lenses having at least one band-pass coating formed thereon, and said second spectral filter assembly comprises a second plurality of field lenses having at least one band-pass coating formed thereon.

8. The solar simulator system as recited in claim 6, wherein said first re-imaging assembly comprises a first plurality of projection lenses and a first plurality of irises, and said second re-imaging assembly comprises a second plurality of projection lenses and a second plurality of irises.

9. A method of retrofitting a solar simulator system that comprises a light source, a tipping lens, a spectral filter assembly, a re-imaging assembly, and an illumination plane, said method comprising:
installing a re-sizing lens at a location along an optical path that starts at the re-imaging assembly and ends at the illumination plane.

10. The method as recited in claim 9, wherein the solar simulator system further comprises a dichroic mirror and a reflector mirror, and the re-sizing lens is installed between the dichroic mirror and the reflector mirror.

11. A method of retrofitting a solar simulator system that comprises a light source, a spectral filter assembly, a re-imaging assembly, and an illumination plane, said method comprising:
installing a tipping lens between the light source and the spectral filter assembly; and
installing a re-sizing lens at a location along an optical path that starts at the re-imaging assembly and ends at the illumination plane.

12. The method as recited in claim 11, wherein the solar simulator system further comprises a dichroic mirror and a reflector mirror, and the re-sizing lens is installed between the dichroic mirror and the reflector mirror.

13. A method of changing an optical power density of a solar simulator system, comprising:
removing a first re-sizing lens having a first focal length; and
installing a second re-sizing lens having a second focal length different than said first focal length.

14. The method as recited in claim 13, wherein said second re-sizing lens has the effect of decreasing the size of an exit beam at an illumination plane, further comprising adding spectral filters to a spectral filter assembly disposed upstream of the re-sizing lens.

15. The method as recited in claim 13, wherein said second re-sizing lens has the effect of increasing the size of an exit beam at an illumination plane, further comprising removing spectral filters from a spectral filter assembly disposed upstream of the re-sizing lens.

16. A method of simulating sunlight comprising:
using a first light source to generate a first optical beam;
focusing the first optical beam;
splitting the first optical beam into a first plurality of beamlets;
spectral filtering the first plurality of beamlets;
re-imaging the first plurality of beamlets so that the beamlets of the first plurality mutually overlap in an illumination plane; and
re-sizing a cross-sectional dimension of the area of overlap of the first plurality of beamlets in the illumination plane.

17. The method as recited in claim 16, further comprising:
using a second light source to generate a second optical beam;
focusing the second optical beam;
splitting the second optical beam into a second plurality of beamlets;
spectral filtering the second plurality of beamlets;
re-imaging the second plurality of beamlets so that the beamlets of the second plurality mutually overlap in the illumination plane; and
re-sizing a cross-sectional dimension of the area of overlap of the second plurality of beamlets in the illumination plane.

18. The method as recited in claim 16, wherein the re-sizing step is performed by a first re-sizing lens, further comprising:
removing the first re-sizing lens; and
substituting a second re-sizing lens in place of the first re-sizing lens,
wherein the first and second re-sizing lenses produce different optical power densities at the illumination plane for the same incoming light.

19. The method as recited in claim 18, further comprising:
using the first light source to generate a second optical beam;
focusing the second optical beam;
splitting the second optical beam into a second plurality of beamlets;
spectral filtering the second plurality of beamlets;
re-imaging the second plurality of beamlets so that the beamlets of the second plurality mutually overlap in the illumination plane; and
using the second re-sizing lens to re-size a cross-sectional dimension of the area of overlap of the second plurality of beamlets in the illumination plane.

* * * * *